UNITED STATES PATENT OFFICE.

WILLIAM GENTLES, OF ST. HELEN'S, ENGLAND.

IMPROVEMENT IN MANUFACTURE OF MURIATE OF AMMONIA.

Specification forming part of Letters Patent No. 212,596, dated February 25, 1879; application filed September 16, 1878.

*To all whom it may concern:*

Be it known that I, WILLIAM GENTLES, of St. Helen's, in the county of Lancashire, England, have invented Improvements in the Production of Muriate of Ammonia, of which the following is a specification:

This invention relates to the production of muriate of ammonia from any liquors containing carbonate of ammonia; and the prominent characteristics of the process are, the distillation of the ammoniacal liquor in a retort or still with worm attached, whereby the carbonate of ammonia is volatilized and set free, thus disengaging it from any impurities with which it had previously existed in combination, which impurities remain or are left behind in the still, and driving such purified volatilized carbonate through the worm into a solution of chloride of calcium, where the carbonic acid of the ammonia-carbonate combines with the calcium of the chloride of calcium and the oxygen of the ammonia, the action being represented by the formula $CACL + NH_4OCO_2 = CAOCO_2 + NH_4Cl$, the result being the production of muriate of ammonia and carbonate of lime.

For the purpose of my invention the ordinary ammoniacal or other gas liquors containing carbonates of ammonia are placed in a still with a worm attached, the exit-pipe of which dips under a solution of calcium-chloride a few inches. The vessel containing solution of calcium-chloride may be of wood or iron, with an agitator placed therein to thoroughly commingle the contents. The solution of calcium-chloride must contain a proper proportion sufficient to decompose all the ammonia-carbonates evolved. The said chloride-of-calcium solution must be altered in quantity or strength to suit the ever-varying quantity or strength of the ammonia-liquor used. After the operation is finished the resulting commingled solution is allowed to thoroughly settle, the supernatant clear liquor may be conveyed to a boiling-down pan, or preferably to a close vessel with worm attached, and the small portion of uncombined ammonia evolved into an acid or condensed as liquor ammonia, and properly purified or utilized as under.

The supernatant clear liquor may be treated with ordinary hydrochloric acid just to acidity, and the arsenic of the calcium-chloride and hydrochloric acid precipitated as tartar-sulphide of arsenic plus a little sulphur. The clear and well-settled liquor is now rendered alkaline by a portion of the ammoniacal liquor evolved and collected from closed vessel, the iron is allowed to settle to the bottom or otherwise separated, and the liquor boiled to fishing or to crystallizing points. The resulting muriate of ammonia will be a firm white article, superior to ordinary make, in being free from the impurities usually contained in ordinarily-manufactured ammonia-muriates.

This process is superior to any of the well-known methods for obtaining muriate of ammonia in which the ammoniacal liquors and the solution of calcium-chloride are commingled in the first instance, for I avoid many steps necessary in the last-mentioned processes to purify the newly-formed chloride resulting from a mixture of the impure liquors with the impure calcium-chloride solution. Among its advantages it may be stated that the slow and tedious operation of sublimation is avoided and a comparatively pure compound in solution is at once obtained, which is cheaply and quickly purified and crystallized.

*Treatment of the precipitated lime-carbonate.*—The fine lime-carbonate is treated with its own bulk of water and thoroughly commingled with the agitator, allowed to settle, and clear supernatant liquor drained off. This washing may be repeated, and liquors from both washings kept to be used in washing next batch of lime-carbonate, proper care being taken to thoroughly eliminate the muriate of ammonia. The lime-carbonate may now be thrown out onto a drainer and allowed to drain, and may then be dried on hot plates or placed over the flues leading from the boiler or still to the chimney and all water expelled. The properly washed and dried lime-carbonate is now in a fit state to be used as a substitute for chalk in producing carbonic acid for aerated waters in the neutralizing-wells of the Weldon chlorine process in the manufacture of carbonate of ammonia, and the resulting calcium-chloride returned to the first operating-vessel; or the lime-carbonate may be applied to any of its well-known uses.

A portion of lime-carbonate may be well used in the still to combine with any non-volatile compounds of ammonia, with acids, or other combinations decomposable with lime-carbonate, and increased evolution of carbonic acid given.

The ammonia-liquor, as distilled from the close vessel with condensing-pipe attached, may be well utilized in gas-factories, where this process is carried on. Thus the ammonia-liquor may be used as a gas-purificant very advantageously by its being introduced into the scrubbers or other part of the ordinary purifying apparatus in place of water, becoming thereby enriched with ammonia, and acting as a powerful purifier.

I am aware that chloride of calcium as an agent for decomposing carbonate of ammonia when both in solution are commingled is well known; hence I do not broadly claim the process for obtaining muriate of ammonia by the employment of chloride of calcium as such decomposing agent; but What I do claim is—

1. A process for the manufacture of muriate of ammonia, consisting in, first, distilling suitable ammonia-liquor; second, passing the volatilized carbonate of ammonia into a solution of the chloride of calcium; third, heating the resultant solution; fourth, treating the remaining clear liquor with hydrochloric acid; fifth, treating same with ammoniacal liquor; sixth, allowing it to then settle; seventh, boiling the supernatant clear liquor to crystallization and allowing same to cool, substantially as set forth.

2. A process for the manufacture of muriate of ammonia, consisting in, first, distilling suitable ammoniacal liquor and passing the volatilized carbonate of ammonia, free from impurities, into a solution of chloride of calcium; secondly, agitating said solution so as to commingle same well with the ammonia-carbonate, and then allowing same to settle, whereby carbonate of lime is precipitated and muriate of ammonia held in solution; thirdly, removing the supernatant clear liquor and heating it to evolve any uncombined ammonia therein; fourthly, treating same with hydrochloric acid just to point of acidity, then precipitating the arsenic of the calcium-chloride and hydrochloric acid as tartro-sulphide plus a little sulphur; fifthly, rendering the clear and well-settled liquor alkaline by adding ammoniacal liquor, and then separating the iron therefrom; sixthly, boiling the liquor to crystallizing-point and allowing same to cool, whereupon muriate of ammonia free from all impurity is obtained, all the several steps of the above process being substantially as hereinbefore described.

WILLIAM GENTLES.

Witnesses:
  Geo. Thos. Sturt,
  E. Edmonds.